United States Patent [19]
Griffin et al.

[11] Patent Number: 5,740,832
[45] Date of Patent: Apr. 21, 1998

[54] ELEVATED COVER FOR BACKFLOW PREVENTION DEVICE

[75] Inventors: Herman W. Griffin, Mt. Juliet; Edgar L. Cantrell, Lebanon, both of Tenn.

[73] Assignee: Griffin & Cantrell Company, Inc., Mt. Juliet, Tenn.

[21] Appl. No.: 743,939

[22] Filed: Nov. 5, 1996

[51] Int. Cl.⁶ .................................................. F16K 49/00
[52] U.S. Cl. ........................... 137/341; 137/377; 137/382
[58] Field of Search .................................. 137/377, 341, 137/382

[56] References Cited

U.S. PATENT DOCUMENTS

| | | | |
|---|---|---|---|
| Re. 33,523 | 1/1991 | Devine | 137/341 |
| 1,204,464 | 11/1916 | Lofton . | |
| 1,322,014 | 11/1919 | Hanna . | |
| 2,937,009 | 5/1960 | Anderson . | |
| 3,120,600 | 2/1964 | True | 219/38 |
| 3,313,241 | 4/1967 | Newman | 103/221 |
| 3,784,785 | 1/1974 | Noland | 219/301 |
| 4,110,603 | 8/1978 | Peterson | 219/535 |
| 4,259,981 | 4/1981 | Busse | 137/375 |
| 4,556,080 | 12/1985 | Picaud | 137/296 |
| 4,558,206 | 12/1985 | Ball | 219/301 |
| 4,726,394 | 2/1988 | Devine | 137/341 |
| 4,798,239 | 1/1989 | Persohn et al. | 165/45 |
| 4,890,638 | 1/1990 | Davenport | 137/382 |
| 4,993,450 | 2/1991 | Dunn | 137/382 |
| 5,078,171 | 1/1992 | Moore et al. | 137/15 |
| 5,150,730 | 9/1992 | Campbell | 137/364 |
| 5,520,207 | 5/1996 | Newsome et al. | 137/15 |

*Primary Examiner*—A. Michael Chambers
*Attorney, Agent, or Firm*—Fish & Richardson P.C.

[57] ABSTRACT

An apparatus for maintaining the temperature of material conveyed through fluid conveying devices. The apparatus may include an enclosure supported upon a chase or chases, which may extend from the enclosure downwardly to the frost line. Heating elements may be included within the chase(s) or enclosure to maintain the temperature of the material and the fluid conveying devices surrounding the material above a predetermined setpoint all the way to the frost line. The enclosure may employ a suitable valve to facilitate the removal of discharged material from the enclosure in applications where the fluid conveying device discharges material to the atmosphere.

27 Claims, 9 Drawing Sheets

ELEVATED COVER FOR BACKFLOW PREVENTION DEVICE

BACKGROUND OF THE INVENTION

The invention relates in general to an apparatus for protecting fluid conveying devices from freezing. More particularly, the invention relates to an elevated, insulated enclosure for protecting a backflow prevention device and its associated piping above ground and below the surface of the ground to the frost line.

Backflow prevention devices are well known and typically include an assembly of one or more check valves installed in a pipeline. These devices prevent the reverse flow, or backflow, of fluid from the downstream pipeline to the upstream supply pipeline or main, which can result when the fluid pressure in the upstream supply pipeline falls below the fluid pressure in the downstream pipeline. The prevention of backflow is particularly important when the downstream pipeline contains contaminated material and the upstream supply pipeline is carrying potable water.

Backflow prevention devices may or may not discharge fluid to the atmosphere. For example, a double check assembly does not discharge fluid. However, when the prevention of backflow is necessitated by health considerations, such as in an installation where contaminated water could be conveyed back into a potable water main, a reduced pressure zone device is included in the assembly. Reduced pressure zone devices discharge a large volume of water when actuated, and thus the downstream water, which may be contaminated, is transferred out of the downstream pipeline to the atmosphere and not back into the upstream supply pipeline. Besides discharging large volumes, these reduced pressure zone devices intermittently discharge small quantities of water. Since these backflow prevention devices are frequently installed in a water supply line outdoors and above ground, it is important that the devices be enclosed and protected from the weather, and particularly from freezing.

It is well known that water lines need to be protected from freezing. Many pipelines are run underground to avoid exposure to ambient temperatures that are below the freezing point of water. Pipelines are also run underground for aesthetic reasons. While a majority of a pipeline may be underground, backflow prevention devices and their associated valving and piping cannot be buried underground because access is needed for proper operation and maintenance of the backflow prevention device. Additionally, discharging backflow prevention devices must be elevated because they must not be submerged in the discharged material. Therefore reduced pressure zone devices cannot be buried in the ground or installed in a floodable pit for the additional reason that they must not be submerged. Thus, in many installations the pipeline is run underground and the portions of the pipeline having backflow prevention devices are constructed above ground level. The backflow prevention devices, valves, and portions of the pipeline above the frost line are subject to freezing and may become inoperable unless they are protected from the weather.

Years ago, large concrete or cast iron boxes were constructed around backflow prevention devices. A door was provided in the top of the box to provide access to the interior of the box for servicing the device. Open drain holes were formed in the lower portions of the side or end walls of the box to drain any water discharged by the backflow prevention device away from the box. These boxes are inferior due to the material of construction and because access to the interior of the box was difficult. Moreover, because of the open fixed drain holes in these boxes, water, foreign objects and most importantly cold air would enter the interior portion of the box. The movement of cold air into the box defeated a central purpose of its design by facilitating the freezing of the water within backflow prevention device and its associated piping and valving.

U.S. Pat. No. Re 33,523, to Devine, discloses another type of apparatus for protecting a backflow prevention device. This apparatus includes a sectionalized cover which is held together by clamps. The top portion of the cover has openings to permit control of the protruding valve stems which extend above the cover. Drain openings are provided at ground level to permit drainage of liquid from the space within the cover. These drain openings are covered by a screen and vertically cut flaps which hang from the top of the opening to ground level. These flaps flex to permit discharged water to flow outwardly. The interior of the cover is insulated and includes an electric heating element. Although there are many drawbacks associated with the Devine cover, an important one is that the openings in the top portion allow air to be transferred to and from the interior of the cover, thus significantly increasing the heating requirements of the enclosure and, in some cases, making freeze protection impractical. Further, the drain openings are not adequately sealed by the flaps and can be blocked by ice, snow, vegetation, dirt, debris, and other objects since the drain openings are at ground level. Additionally, heat may be transferred only in the area above the surface of the ground.

Another type of cover is disclosed in U.S. Pat. No. 4,890,638 (the "'638 cover"), which includes a cover member having a top wall and four side or end walls. While the cover discussed in this patent does not contain openings in the top portion as described in the Devine apparatus, the '638 cover does have drain openings at ground level in the bottom edge portion of the side walls to allow water discharged by the backflow prevention device to escape from the interior of the cover. These drain openings are covered by drain flaps, which are of the same rigid construction as the cover walls. These flaps are hingedly attached to the cover and are spring biased to be maintained in a closed position with the bottom of the flap above the top floor surface. This cover reduces some of the flow of cold air to the backflow prevention device, however it suffers from the limitations that air can blow under the flaps and the temperature of the portion of the pipeline above the frost line and below the ground cannot be controlled. Like the Devine apparatus, the drain openings in the '638 cover can be blocked by a variety of objects because they are also at ground level. Furthermore, the drain flap construction is such that a small object can block the entire drain opening.

The foregoing demonstrates that there is a need for an energy-efficient apparatus which protects backflow prevention devices and the portion of the connected pipeline above the frost line from freezing as well as avoids blockage of the drain openings.

SUMMARY OF THE INVENTION

The invention satisfies the need and avoids the drawbacks of the prior art by providing an apparatus which efficiently protects a backflow prevention device or any number of fluid conveying or monitoring devices from freezing to a depth to the frost line. The invention further prevents blockage of the drain openings by ice, snow, vegetation, dirt, debris, and other objects and avoids the potential of submerging the fluid conveying devices in discharged fluid.

More specifically, the invention provides an apparatus for maintaining the temperature of the material conveyed through a pipeline above the freezing point of the material. The apparatus of the invention may include an enclosure being supported upon a chase or chases, which extend from the enclosure to ground level or into the ground and downwardly to the frost line. Heating elements, which may be powered in any known manner, may be included within the chases or enclosure to maintain the temperature of the material and the fluid conveying devices. In one embodiment that may be employed in connection with backflow prevention devices that utilize reduced pressure zone devices, the enclosure may include a suitable valve adjacent an opening in its bottom wall, which is above ground level, to prevent cold air, ice, snow, animals, vegetation, trash, dirt and the like from entering the enclosure yet allowing for effective removal of discharged water from the enclosure.

DETAILED DESCRIPTION

Figure 1:
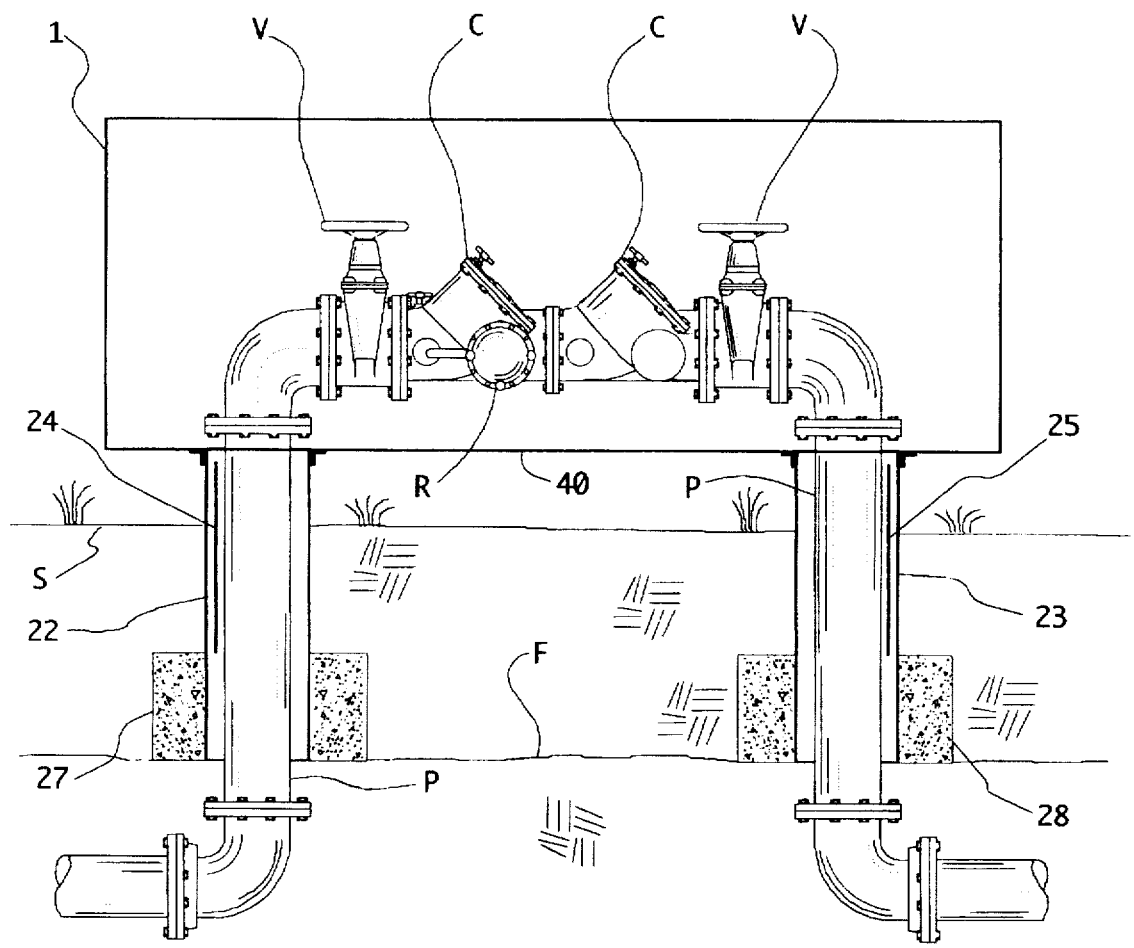
FIG. 1 is a side elevational view of an elevated cover enclosing a backflow prevention device including its associated valving and upstream and downstream piping, with the ground level frost line and concrete footers identified.

FIG. 1 illustrates one embodiment of the invention. The elevated cover 1, along with structural pedestal chases 22, 23, enclose the backflow prevention device, which is shown in FIG. 1 as two check valves C, a relief valve R, servicing valves V and piping P. Although the invention is described for use in connection with a backflow prevention device, the enclosure may be employed to maintain the temperature of material being conveyed through any number of fluid conveying or monitoring devices, such as meters, vacuum breakers, standpipes, pressure regulators, and pumps (referred to generally as "fluid conveying devices").

The assembly shown in FIG. 1 constitutes a portion of a substantially longer pipeline wherein a majority of the pipeline is installed underground. The backflow prevention device is constructed above the ground to allow for its monitoring and servicing. Additionally, if the device is one that discharges water, the backflow prevention device must be disposed high enough above ground level to permit the discharge of water to the atmosphere without submerging the backflow prevention device.

In this embodiment elevated cover 1 is depicted as a rectangular box that may be supported by structural pedestal chases 22, 23. Heater elements 24, 25 contained within elevated cover 1 and chases 22, 23 are utilized to maintain the backflow prevention device and associated valves and piping above the freezing point of the material transferred within the pipeline. The invention is particularly useful for pipelines carrying water, however its principles may be used for the protection of fluid conveying devices transferring any other material where either the material itself or the fluid conveying device surrounding the material is susceptible to solidification, such as a pressure regulator controlling the flow of natural gas. If the fluid conveying device has only one vertically rising pipeline or if one or more of the vertically rising pipelines are close together, then a single chase may be utilized to surround the piping and to support the elevated cover 1. On the other hand, if more than two chases are needed to cover a plurality of vertically disposed pipelines, such as when two or more backflow devices are constructed in parallel, then a number of chases may be employed to support an enlarged, elevated cover 1 and to surround the pipelines.

Figure 2:
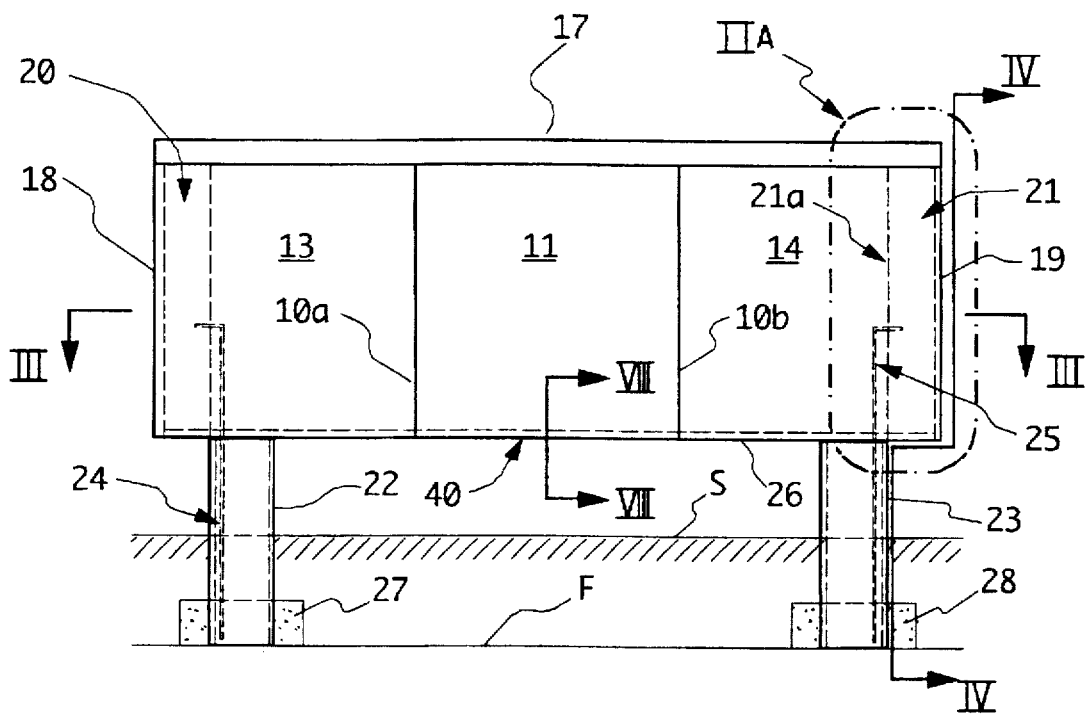
FIG. 2 is a side elevational view of an elevated cover constructed according to the principles of the invention with the heater element shown in phantom.

As shown in FIGS. 1 and 2, structural pedestal chases 22, 23 may extend below the surface S, which may be the ground, pavement, concrete, or the like, and may extend all the way to the frost line F. The temperature of the material and fluid conveying devices may be maintained to the frost line F by employing heater elements 24, 25 in the cover 1 and in the chases 22, 23. In warmer climates, however, the chases 22, 23 may be supported at ground level, e.g., on a concrete slab. The figures display concrete footers 27, 28 that may provide support for the piping P and the chases 22, 23. The bottom of these footers may be at or below the frost line F. Chases 22, 23 may be bolted to their supporting structures or attached in any suitable manner known in the art.

Figure 3:
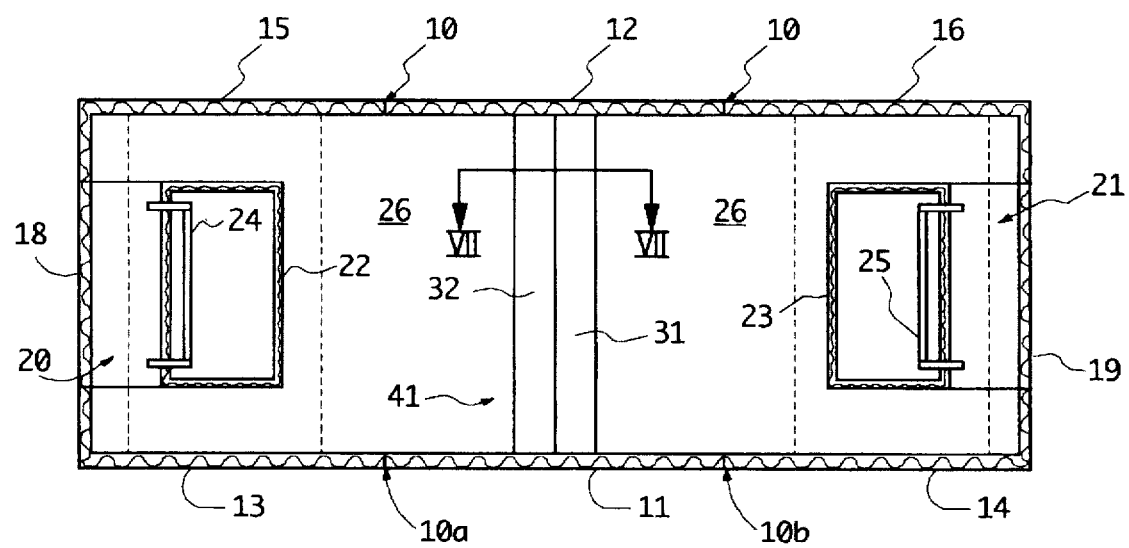
FIG. 3 is a cross-sectional top view of the elevated cover taken along line III—III of FIG. 2.

FIGS. 2 and 3 show greater detail of the elevated cover 1. The elevated cover 1 is illustrated as being defined by top wall 17, bottom wall 26, end doors 18, 19, stationary side walls 13–16, and access doors 11, 12. The wall and door material may be metal, wood, plastic or any other suitable material which is rigid enough to maintain its shape without collapsing due the effects of weather, UV radiation, vandalism, animals, discharge of high pressure water, and the like. In a preferred embodiment the walls and doors are made of insulation that is approximately 1½ inches thick covered with aluminum sheet metal that is about 0.050 to about 0.063 inches thick. The insulation may be polyisocyanurate or any other suitable insulating material that has a high R-value, such as an R-value of approximately 8. Of course, depending on weather conditions, fluid conveying factors, and other considerations, the construction and thicknesses of the walls and doors may vary.

The access doors 11, 12 may be attached to stationary side walls 13–16 at part lines 10 via any suitable, releasably engageable device. For example, access door 11 may be hinged to stationary side wall 13 at part line 10a and may be releasably engaged to stationary side wall 14 at part line 10b, or the entire access door 11 may be removable, to allow for service and monitoring of the backflow prevention device and the discharge valve 41 which may be installed below discharge port 40. Locking mechanisms (not shown) may be installed to discourage tampering or vandalism of the enclosed, fluid conveying devices. The construction of elevated cover 1 and the readily easy assembly and disassembly of its components is similar to that described in U.S. Pat. No. 4,890,638, the disclosure of which is incorporated by reference herein in its entirety. The enclosures utilized for smaller fluid conveying devices may be constructed as a unitary cover to avoid the complexities associated with the assembly and disassembly of cover components. The unitary cover consists of a top wall and side walls that may be lifted off of the bottom wall to allow access to the interior of the elevated cover 1.

If ambient conditions are such that freezing may occur, then power may be delivered to the area enclosed by the elevated cover 1 to maintain the temperature above a setpoint controlled by a controller, such as a thermostat. Power may be delivered via electrical current (alternating or direct), solar power, geothermal power, wind power, and the like. The power generator(s) may be located inside or outside of the elevated cover 1. For example, one or more heater elements 24, 25 may be installed within the elevated cover to control the temperature within the elevated cover 1. These heater elements 24, 25 may be disposed in a variety of places including the top, sides and bottom of the elevated cover 1 and the space between the piping P and the inside of one or more of the structural pedestal chases 22, 23. Any suitable heater having the capability of maintaining the fluid conveying device and the material therein at a temperature high enough to avoid freezing the material and the fluid conveying device may be used in combination with the elevated cover 1. A preferred heater, Formed Watrod, Catalogue #RGNA 132105, manufactured by Watlow, #6 Industrial Loop Road, Hannibal, Mo., has been found to be a useful device for maintaining the temperature within the elevated cover 1. In an alternative embodiment a heated fluid may be blown from outside the elevated cover 1 into the interior of the cover. The heated fluid may be generated by any suitable manner and from any source which heats the inside the cover, such as moving the fluid past an electric or gas heating element and directing it into the cover.

Figure 2A:
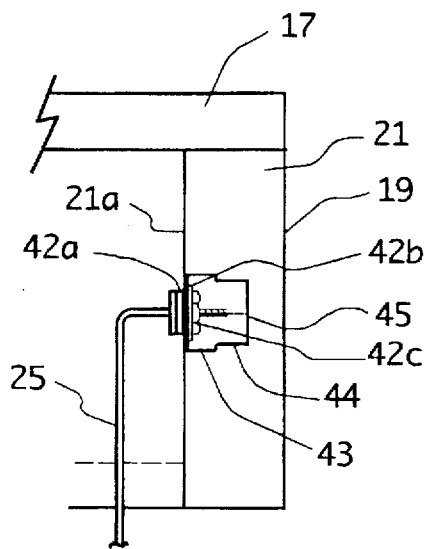
FIG. 2A is an enlarged view of the section IIA of FIG. 2 which illustrates the connection between the heater element and electrical cabinet.

Elevated cover 1 may also enclose one or more electrical cabinets 20, 21, which may provide a junction box to heater elements 24, 25. In a preferred embodiment these cabinets 20, 21 are protected by the cover 1 as they are illustrated as being disposed in the end portions of the elevated cover 1 and are accessible via end doors 18, 19. FIG. 2A illustrates a preferred connection which may be employed to seal electrical cabinet 21 from any water discharged within the cover 1. Bulkhead gasket 42a, bulkhead washer 42b, and bulkhead nut 42c may be utilized to fix heater element 25 and a junction box including an electrical box 43, electrical box extension 44, and flat cover plate 45 to inner electrical cabinet wall 21a. Cabinets 20, 21 also may be installed just inside access doors 11, 12, along the side walls 13–16, near the top wall 17, or in a location outside of the elevated cover 1.

Figure 4:
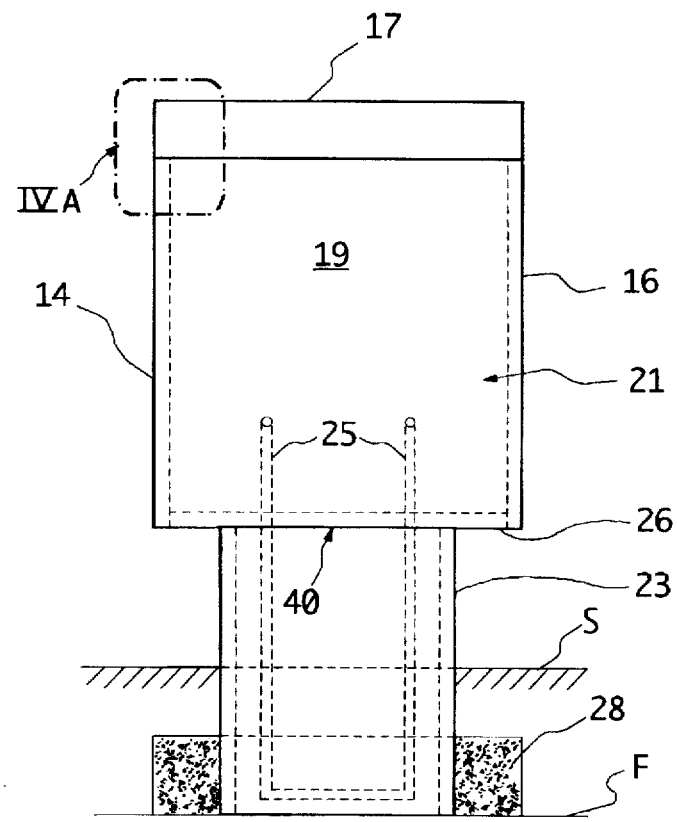
FIG. 4 is an elevational view, partially in cross-section, of the elevated cover taken along line IV—IV of FIG. 2 with the heater element shown in phantom.

FIG. 4 is a view, partially in cross-section, of the elevated cover 1 along line IV—IV of FIG. 2. FIG. 4 illustrates the top wall 17, bottom wall 26, side walls 14 and 16, and the end door 19 of the elevated cover 1. Structural pedestal chase 23 is shown extending through the surface S and continuing all the way down through the concrete footer 28 to the frost line F. This view illustrates heater element 25, in phantom, extending from the elevated cover 1 and along the chase 23 to the frost line F. Due to the excessive stratification of heat within a cover of the type described by the invention, a lower location of the heater element assures the maintenance of the temperature of the material and the portion of the piping P that is below the ground surface S yet above the frost line F.

Figure 4A:
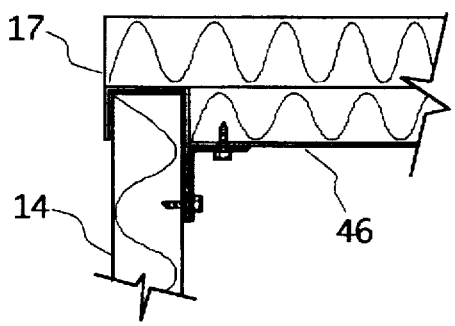
FIG. 4A is an enlarged view of section IVA of FIG. 4 which illustrates the connection between the top wall and side walls.
Figure 5:
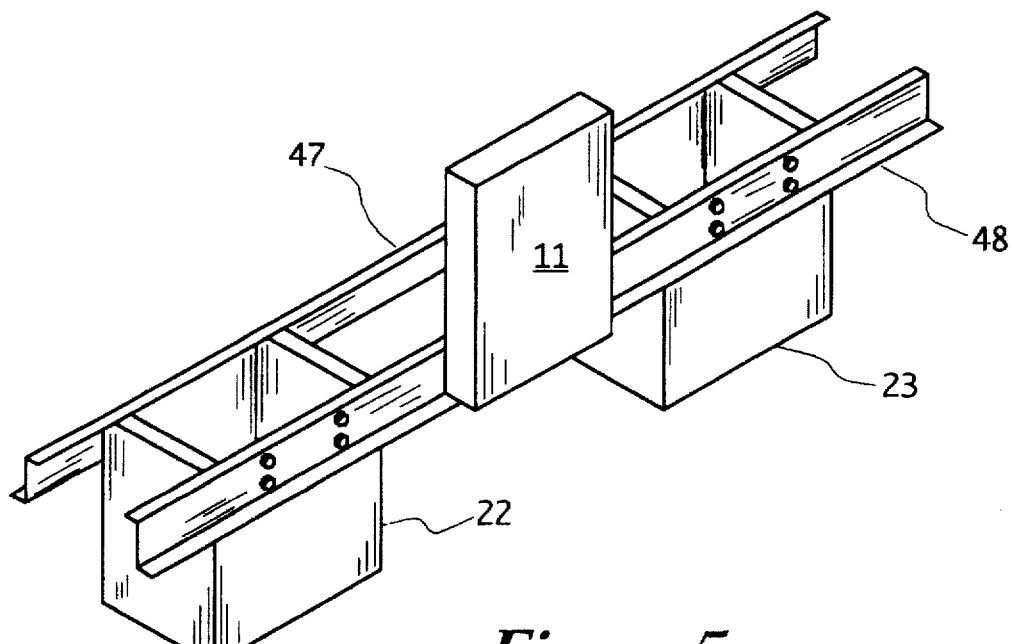
FIG. 5 is a perspective view of the structural supports utilized in one embodiment of the invention.
Figure 6:
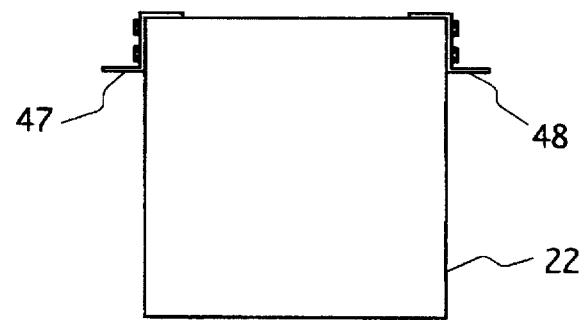
FIG. 6 is an end view of FIG. 5.

FIG. 4A is an enlargement of FIG. 4 and illustrates one manner in which the top wall 17 and side wall 14 may be joined. The top wall 17 is additionally supported by roof structural member 46. FIGS. 5 and 6 generally demonstrate a preferred structural method of supporting elevated cover 1 upon structural support zees 47, 48 which are supported upon chases 22, 23. More specifically, FIG. 5 shows access door 11 resting upon structural support zee 48. Although not illustrated, side walls 13–16 may be supported upon zees 47, 48. Zees 47, 48 may be fabricated by bending lengths of sheet metal.

Figure 7:
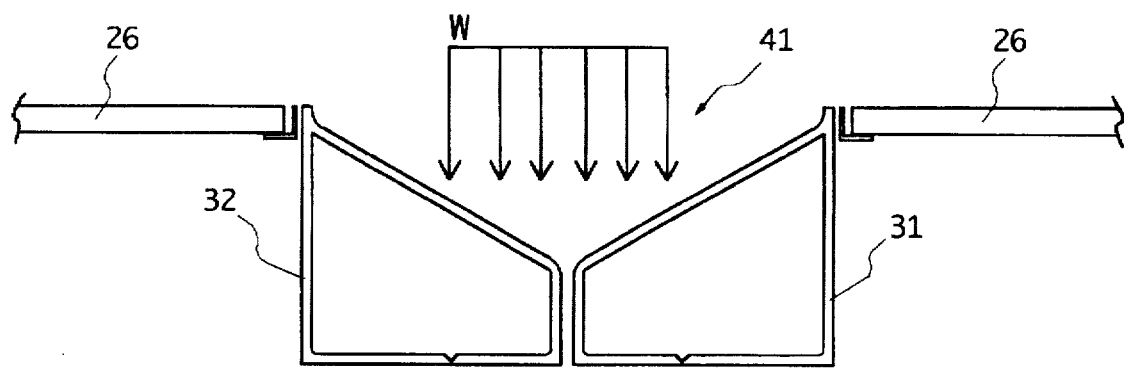
FIG. 7 is a cross-sectional side elevational view of a discharge valve of the elevated cover taken along line VII—VII of FIG. 3 and constructed according to the principles of the invention.
Figure 8:
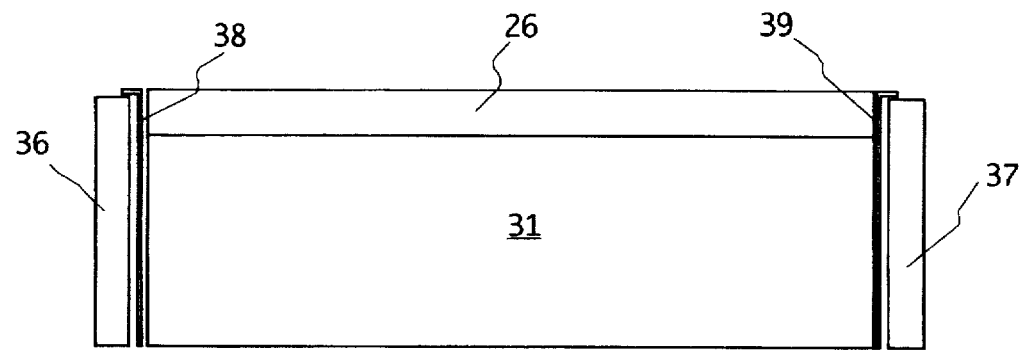
FIG. 8 is a cross-sectional end elevational view of the discharge valve shown in FIG. 7 taken along line VIII—VIII of FIG. 2.

FIGS. 7–11 provide an illustration of one discharge valve constructed according to the principles of the invention. FIG. 7 shows a side elevational view of discharge valve 41. Discharge valve 41 is located far enough below bottom wall 26 and has an opening that is large enough so that discharged water does not accumulate in elevated cover 1. Discharge valve 41 is illustrated as being formed of two valve halves 31, 32 that are secured to the bottom wall 26 of the elevated cover 1. As shown in FIG. 8, valve halve 31 (and valve halve 32, not shown) may also be secured at valve halve ends 38, 39 to structural frame members 36, 37. When the backflow prevention device dumps a large volume of water, and even when it drips smaller quantities, discharge valve 41 will open and allow water stream W to be removed from the elevated cover 1.

Figure 9:
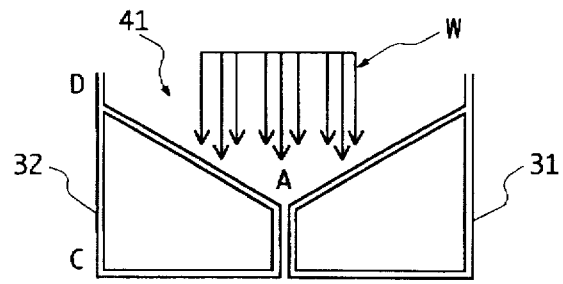
FIGS. 9, 10 and 11 are end elevational views of the discharge valve shown in FIG. 7 illustrating the valve in closed, partially open and fully open positions, respectively.
Figure 10A:
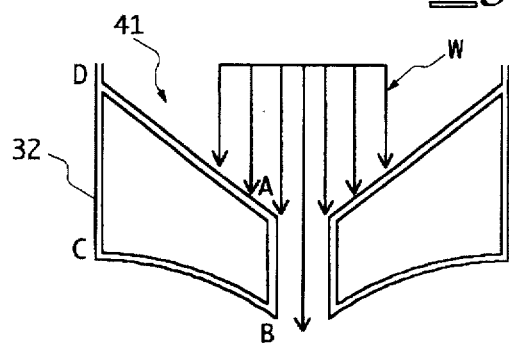
Figure 10B:
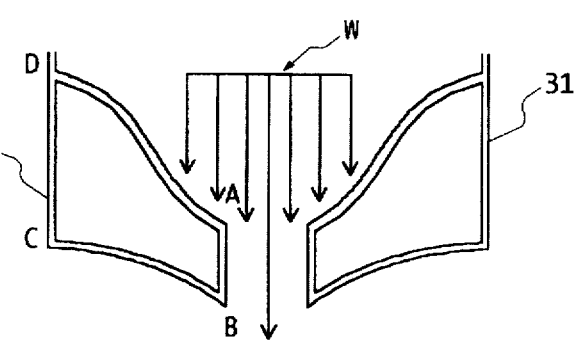
Figure 11:
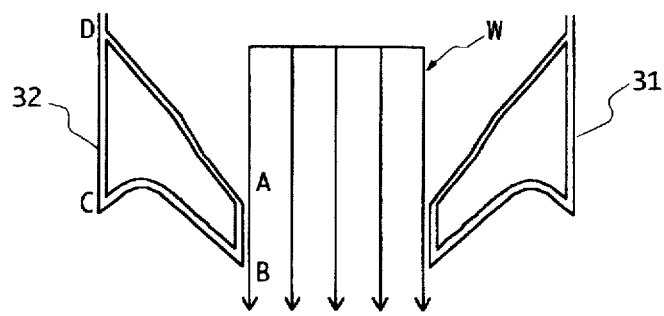

The operation of discharge valve 41 is described in connection with FIGS. 9–11. FIG. 9 illustrates discharge valve 41 in the closed position and FIG. 11 demonstrates a fully open discharge valve 41. FIGS. 10A and 10B are intermediate and show discharge valve 41 in partially opened positions. For the purposes of this discussion the four corners of valve halve 32 have been identified as corners A, B, C and D. As described above, corner D may be attached to bottom wall 26 and to structural frame members 36, 37 at its ends 38, 39 and thus remains in the same location regardless of the position of valve halve 32. Depending on the strength and flexibility of the material of construction of discharge valve 41, corner C may rotate away from the flow of water or may remain in substantially the same position during the opening and closing of discharge valve 41. For the purposes of this discussion, corner C will essentially remain in the same location during operation of discharge valve 41.

FIG. 9 shows the discharge valve 41 as it is depicted in FIG. 7. As water flows toward discharge valve 41, corners A and B are deflected downward and valve halves 31 and 32 are separated, thereby allowing water to be transferred from the lower portion of elevated cover 1. This partially opened position is illustrated in FIGS. 10A and 10B. Depending on the strength and flexibility of the material of construction of the discharge valve 41, the segment of the valve halve 32 between corner D and corner A may (FIG. 10B) or may not (FIG. 10A) deflect. In the fully open position as illustrated in FIG. 11, corners A and B are further deflected downward and the segment of the valve halve 32 between corner C and corner B is shown in a flexed position. The valve halves 31 and 32 return to their original position, as is shown in FIGS. 7 and 9, after the backflow prevention device completes discharging and the water flowing toward discharge valve 41 is removed.

Figure 12:
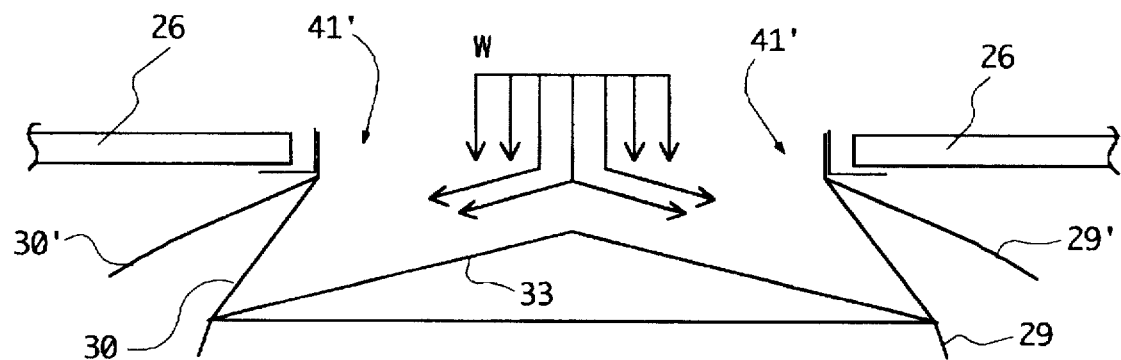
FIG. 12 is a side elevational view of another discharge valve of the elevated cover constructed according to the principles of the invention.
Figure 12A:
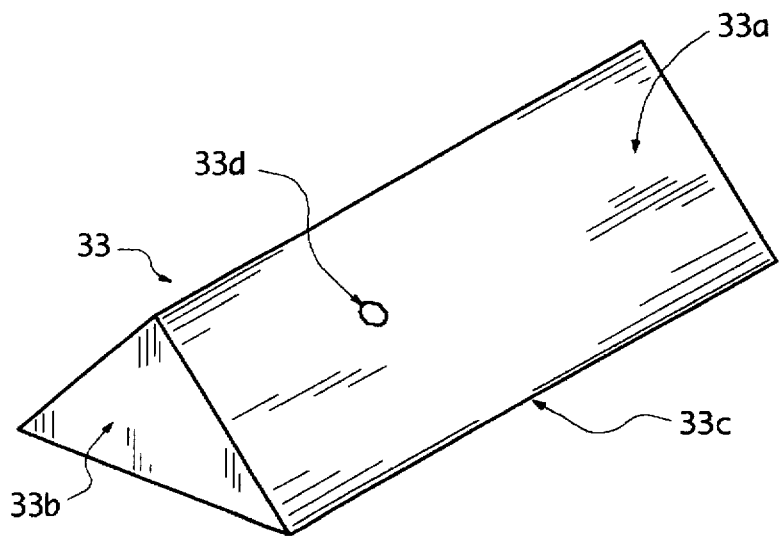
FIG. 12A is an enlarged view of the discharge valve of FIG. 12.
Figure 13:
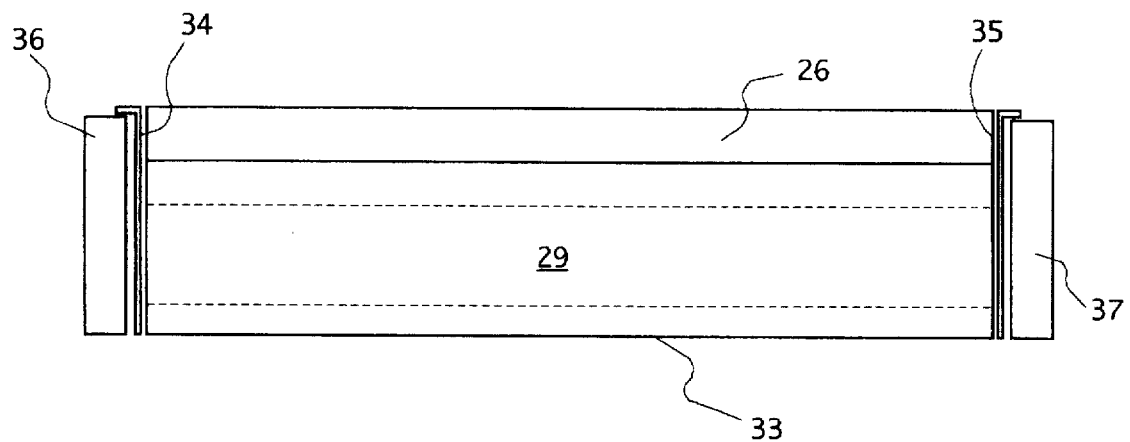
FIG. 13 is an end elevational view of the discharge valve of FIG. 12.

FIGS. 12 and 13 illustrate another discharge valve 41' that is useful in combination with the elevated cover of the invention. FIG. 12 shows a side elevational view of discharge valve 41'. Discharge valve 41' may be formed through the combination of a diverter shield 33 and a pair of valve flaps 29, 30. Although FIG. 12 illustrates the use of two valve flaps, this embodiment of the invention contemplates the use of a single flap or more than two flaps if warranted by the installation conditions, such as water throughput, discharge pressure of the pipeline, size of the cover, and the like. The diverter shield 33 may be insulated to minimize the loss of heat therethrough. In a preferred embodiment illustrated in FIG. 12A, diverter shield 33 may be formed as a tent-like structure having a pair of ascending walls 33a forming an inverted Vee, a pair of side walls 33b attached to the ascending walls 33a, and a bottom wall 33c. This structure may be insulated by injecting liquid insulation into a hole 33d formed in wall 33a and then sealing hole 33d.

In the embodiment illustrated in FIGS. 12 and 13, the diverter shield 33 may be supported by structural frame members 36, 37, however any suitable device supporting the diverter shield 33 in a position to form discharge valve 41' is contemplated by the invention. Valve flaps 29, 30 are secured to the bottom wall 26 of elevated cover 1 and extend to and lay over diverter shield 33. The amount of surface contact between valve flaps 29, 30 and diverter shield 33 may be large or may be minimal as is shown in FIG. 12.

As shown in FIG. 13, valve flap 29 (and valve flap 30, not shown) may also be secured at valve flap ends 38, 39 to structural frame members 36, 37. Like discharge valve 41, discharge valve 41' may be disposed far enough below bottom wall 26 and has a large enough opening that discharged water does not accumulate within cover 1. When the backflow prevention device discharges any volume of material, water stream W will force valve flaps 29, 30 away from diverter shield 33 and allow the discharged water to be removed from elevated cover 1. As the water flows out of the elevated cover 1 the valve flaps 29', 30' will be forced upwardly and outwardly away from diverter shield 33, as is shown in FIG. 12. Of course, the flexing of the valve flaps 29, 30 will depend on the strength and flexibility of the material of construction of the valve flaps 29, 30.

Any material that flexes enough so that it forms an opening and is resilient enough to return to its original position and seal the discharge opening is a material that may be successfully utilized as the material of construction for the valve flaps 29, 30 and valve halves 31, 32. Cured reinforced or non-reinforced EPDM (Terpolymer of Ethylene, Propylene, and Diene) compounded elastomer available as "Sure-Seal EPDM membrane" from Carlisle Tire & Rubber, Carlisle, Pa., is a preferred material due to its flexibility, strength and resiliency over a wide range of temperatures. In a preferred embodiment the material utilized for valve flaps 29, 30 may be produced from extruded sheet material having a thickness of approximately 0.06 inches. The material used for valve halves 31, 32 may be manufactured via extrusion through a die which provides for the hollow shape illustrated in FIG. 5.

It is believed that the structural arrangement of the cover 1 and discharge valves 41, 41' is such that accumulation of material and substantial flooding of the chases 22, 23 will be avoided or minimized. However, flooding of the space between piping P and the structural pedestal chases 22, 23 with water will not defeat the advantages of the elevated cover 1 since the water either will leak past the bottom of chases 22, 23, will evaporate due to ambient temperatures or, if the elevated cover includes heater elements 24, 25, will evaporate due to temperatures created by these heaters. Additionally, to avoid the problems associated with the discharge of water, the utilization of closed cell insulation, water proof adhesives, heating elements designed for immersion heating of liquids, and metals selected for their corrosion resistance are preferred.

What is claimed is:

1. Apparatus for protecting an above ground fluid conveying device in fluid communication with valves and piping upstream and downstream of the device, comprising:

a cover adapted to be disposed above ground level and configured to enclose the fluid conveying device, said cover having a top wall, side walls and a bottom wall, the top wall, side walls and bottom wall of said cover being insulated;

the bottom wall of said cover having an opening permitting fluid transfer out of said cover; and the bottom wall having one or more holes adapted to allow the upstream and downstream piping to pass therethrough;

wherein the opening in the bottom wall of said cover is distinct from the one or more holes in the bottom wall of said cover.

2. The apparatus of claim 1 further comprising a heater, said heater disposed within said cover.

3. The apparatus of claim 1 further comprising a valve disposed in the opening in the bottom wall of said cover.

4. The apparatus of claim 3 wherein said valve comprises a diverter plate and a flap, said flap extending between the bottom wall and said diverter plate.

5. The apparatus of claim 4 further comprising a plurality of flaps extending between the bottom wall and said diverter plate.

6. The apparatus of claim 4 wherein said diverter plate comprises insulation.

7. The apparatus of claim 3 wherein said valve comprises a pair of flaps, said flaps arranged adjacent one another and extending across the opening in the bottom wall.

8. Apparatus for protecting an above ground fluid conveying device in fluid communication with valves and piping upstream and downstream of the device, comprising:

one or more vertically oriented chases, each said chase being insulated and configured to surround the piping in fluid communication with the fluid conveying device; and a cover adapted to be disposed above ground level and to surround the fluid conveying device, said cover having a top insulated wall, side insulated walls and a bottom insulated wall, the bottom wall of said cover supported upon said one or more chases.

9. The apparatus of claim 8 wherein a pair of chases support said cover.

10. The apparatus of claim 8 further comprising a heater, said heater being disposed in said one or more chases.

11. The apparatus of claim 8 further comprising a heater, said heater being disposed in the cover.

12. The apparatus of claim 8 wherein said chases are disposed above ground level.

13. The apparatus of claim 8 wherein said chases extend below ground level.

14. The apparatus of claim 8 wherein said chases extend below ground level to the frost line.

15. The apparatus of claim 8 further comprising a solar powered heating element, said heating element disposed so that the fluid and the fluid conveying devices are prevented from freezing.

16. The apparatus of claim 8 further comprising a heating element powered by direct current, said heating element disposed so that the fluid and the fluid conveying devices are prevented from freezing.

17. The apparatus of claim 8 further comprising a heating element powered by alternating current, said heating element disposed so that the fluid and the fluid conveying devices are prevented from freezing.

18. The apparatus of claim 8 further comprising a heating element powered by geothermal power, said heating element disposed so that the fluid and the fluid conveying devices are prevented from freezing.

19. The apparatus of claim 8 further comprising a source of heated air, said source directed into said cover so that the fluid and the fluid conveying devices are prevented from freezing.

20. The apparatus of claim 1 wherein the bottom wall of said cover comprises an opening.

21. The apparatus of claim 20 further comprising a valve disposed adjacent the opening.

22. The apparatus of claim 21 wherein said valve comprises a diverter plate and a flap, said flap extending between the bottom wall and said diverter plate.

23. The apparatus of claim 22 further comprising a plurality of flaps extending between the bottom wall and said diverter plate.

24. The apparatus of claim 22 wherein said diverter plate comprises insulation.

25. The apparatus of claim 21 wherein said valve comprises a pair of flaps, said flaps arranged adjacent one another and extending across the opening in the bottom wall.

26. The apparatus of claim 8 further comprising support zees disposed between said cover and said one or more chases.

27. The apparatus of claim 8 further comprising electric cabinets disposed within said cover.

* * * * *